(No Model.)

J. D. ANSLEY.
TROLLEY WHEEL.

No. 518,362.   Patented Apr. 17, 1894.

Witnesses:
Robert Garrett
G. W. Rea.

Inventor:
John D. Ansley.
By James L. Norris.
Atty.

UNITED STATES PATENT OFFICE.

JOHN D. ANSLEY, OF CAMBRIDGE, MASSACHUSETTS.

TROLLEY-WHEEL.

SPECIFICATION forming part of Letters Patent No. 518,362, dated April 17, 1894.

Application filed July 27, 1893. Serial No. 481,616. (No model.)

*To all whom it may concern:*

Be it known that I, JOHN D. ANSLEY, a subject of the Queen of Great Britain, residing at Cambridge, in the county of Dorchester and State of Massachusetts, have invented new and useful Improvements in Trolley-Wheels, of which the following is a specification.

My invention relates to electric trolleys and has for its object to provide trolley wheels, and loose pulleys generally, with bushings that will be non-fusible and practically indestructible by friction or the action of the electric current.

I have found that pure copper possesses the necessary requisites for a durable trolley wheel bushing that will not be burned out by the electric current and will suffer no appreciable wear from friction. The bushings of brass sometimes used in trolley wheels are rapidly destroyed by action of the electric current, lasting usually for only a few days and rarely more than a week, while the non-fusible character of a pure copper bushing enables it to endure for months with little or no lubrication. It has been proposed to construct the entire trolley wheel of copper but this is objectionable not only on account of the expense but also because the softness of pure copper renders it unsuitable as a material from which to make the whole of the wheel.

My invention consists in a bushing of pure copper for trolleys and loose pulleys generally; and further in the construction and combination of the parts of a trolley wheel or pulley having a pure copper bushing, as hereinafter more particularly set forth.

Figure 1:
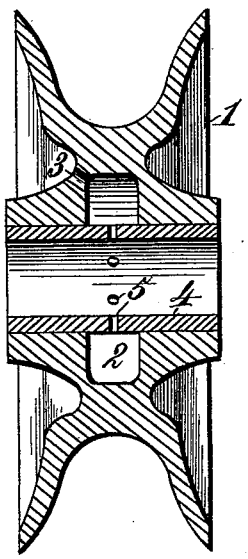
Figure 2:
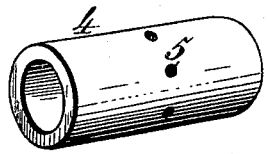

In the annexed drawings illustrating the invention—Figure 1, is a central transverse section of a trolley wheel provided with a bushing of pure copper and showing an annular chamber formed in the hub of the wheel for reception of lubricating material that is permitted to pass to the shaft or axis through suitable perforations in the bushing. Fig. 2 is a perspective of the copper bushing detached.

Referring to the drawings, the numeral 1 designates an electric trolley wheel which may be constructed of any suitable material and in any approved form.

In the central portion of the wheel hub is an annular recess or chamber 2 adapted for reception of a suitable lubricant that may be introduced through a filling orifice 3 located at a convenient point. The hub of the wheel is lined by a bushing 4 of pure copper which is preferably provided about midway its length with one or more perforations 5 for passage of oil or other lubricant from the chamber 2 onto the wheel shaft or axis. The oil chamber 2 and perforations 5 may, however, be dispensed with as I have found that a bushing of pure copper will withstand frictional wear for a long time without requiring lubrication. But when a self oiling trolley is desired, the chamber 2 in the wheel and the perforations 5 in the copper bushing 4 may be provided, as shown. The pure copper bushing possesses excellent qualities for resisting frictional wear and being non-fusible at any temperature to which it would be subjected in practical use it will not be burned out or otherwise injuriously affected by action of the electric current employed for propelling cars and like purposes.

What I claim as my invention is—

1. A bushing of pure copper for trolley wheels and loose pulleys, substantially as described.

2. The combination with a trolley wheel or pulley having in its hub an annular recess or chamber for reception of a lubricant, of a pure copper bushing having a perforation or perforations communicating with said chamber, substantially as described.

In testimony whereof I have hereunto set my hand in presence of two subscribing witnesses.

JOHN D. ANSLEY.

Witnesses:
LUKE A. WILDER,
JOHN ROWE, Jr.